United States Patent [19]
Takizawa

[11] Patent Number: 5,632,111
[45] Date of Patent: May 27, 1997

[54] FISHING ROD WITH REEL FASTENER

[75] Inventor: Shinya Takizawa, Tokyo, Japan

[73] Assignee: Daiwa Seiko, Inc., Tokyo, Japan

[21] Appl. No.: 363,578

[22] Filed: Dec. 23, 1994

Related U.S. Application Data

[63] Continuation of Ser. No. 110,708, Aug. 23, 1993, abandoned.

[30] Foreign Application Priority Data

Sep. 1, 1992 [JP] Japan .................. 4-067059 U

[51] Int. Cl.$^6$ .......................... A01K 87/06; A01K 87/08
[52] U.S. Cl. ........................................ 43/20; 43/22
[58] Field of Search ................... 43/22, 23, 20; D22/144

[56] References Cited

U.S. PATENT DOCUMENTS

| | | | |
|---|---|---|---|
| D. 335,525 | 5/1993 | Chapman | D22/142 |
| 4,516,351 | 5/1985 | Highby | 43/22 X |
| 4,653,215 | 3/1987 | Strader | 43/22 X |
| 4,653,217 | 3/1987 | Ohmura | 43/20 |
| 4,839,981 | 6/1989 | Yasui | 43/22 X |
| 4,848,022 | 7/1989 | Ozehi et al. | 43/22 X |
| 4,864,764 | 9/1989 | Yamato | 43/22 |
| 5,115,591 | 5/1992 | Oyama | 43/22 |
| 5,189,824 | 3/1993 | Yamato | 43/22 |
| 5,199,207 | 4/1993 | Nakagawa | 43/22 |
| 5,222,319 | 6/1993 | Yamato | 43/22 |
| 5,291,683 | 3/1994 | Yamato | 43/22 |
| 5,291,684 | 3/1994 | Oyama | 43/22 X |
| 5,337,507 | 8/1994 | Oyama et al. | 43/23 |

FOREIGN PATENT DOCUMENTS

| | | |
|---|---|---|
| 2-973 | 1/1990 | Japan . |
| 2-67765 | 5/1990 | Japan . |
| 3-76462 | 7/1991 | Japan . |
| 3-102850 | 10/1991 | Japan . |

Primary Examiner—Jeanne Elpel
Attorney, Agent, or Firm—Longacre & White

[57] ABSTRACT

A fastening arrangement for securing a fishing reel to a fishing wherein the fastening arrangement includes a bulge to enhance controllability of the fishing rod, and a constriction receiving one of the angler's fingers to enable precision manipulation of the fishing rod.

13 Claims, 2 Drawing Sheets ent Ser. No. 08/110,708, filed Aug. 23, 1993, which was abandoned upon the filing hereof.

BACKGROUND OF THE INVENTION a) Field of the Invention

The present invention concerns fastening means for attaching a fishing reel to a fishing rod. Specifically, the present invention is directed to fastening means for lightweight fishing rods in which minute, precise movements are required, such as while fishing for small fish.

b) Description of Related Art

While waiting for a fish to bite the bait, an angler may grasp the fishing rod by a conventional fishing rod grip located either between the reel and the tip end of the fishing rod, or between the reel and the butt end of the fishing rod. Alternatively, it is not uncommon for the angler to grasp the reel in the proximity of where the fishing reel is attached to the fishing rod.

Japanese Utility Model Application (OPI, i.e. "unexamined published application") No. 3-102850 discloses a reel fastener including a protuberance (2) formed on an upper surface. The protuberance prevents a gap from being formed between the palm of the angler's hand and the upper surface when the fishing rod is grasped.

Japanese Utility Model Application (OPI) No. 2-67765 similarly discloses a cylindrical cover for a fishing rod with a protuberance (8) extending away from the fishing reel.

The enlarged size of the reel fasteners in the prior art improve the angler's grasp of the fishing reel, whereby control of the fishing rod becomes limited to broad movements of the angler's body including the wrist, arm or shoulder. Unfortunately, it makes precise manipulation of the fishing rod, such as by the angler's fingers more difficult.

SUMMARY OF THE INVENTION

Accordingly, it is an object of the present invention to overcome the aforementioned problem and provide fastening means linking securing means on a fishing rod with mounting means on a fishing reel. The fastening means also include a bulge extending radially outward away from a longitudinal axis of the fishing rod, as well as a constriction located between the bulge and a tip end of the fishing rod.

The bulge increases the stability while grasping the fastening means whereas the constriction is adapted to receive the angler's finger for precisely controlling minute movements of the fishing rod. Essentially, the fishing rod may be precisely manipulated by simple movements of the angler's finger rather than attempting to attenuate the broad movements of the angler's body including the wrist, arm or shoulder.

DESCRIPTION OF THE PREFERRED EMBODIMENT

Figure 1:
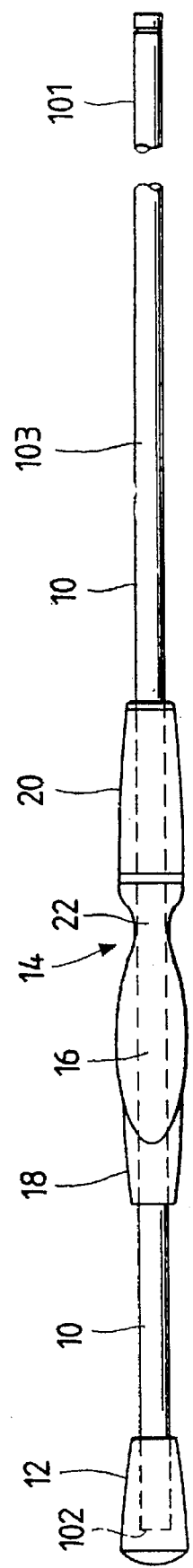
FIG. 1 is a plan view of a fishing rod according to the present invention.
Figure 2:
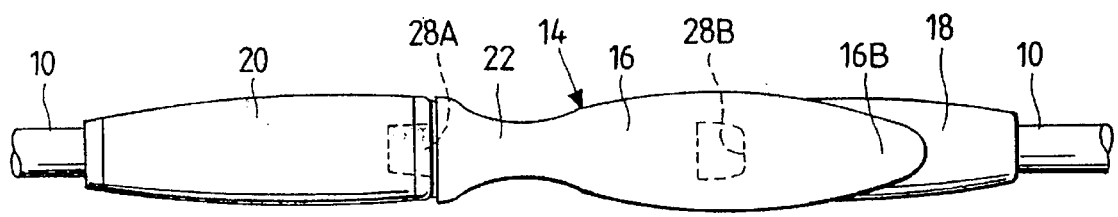
FIG. 2 is an enlarged plan view of the fishing rod according to the present invention.
Figure 3:
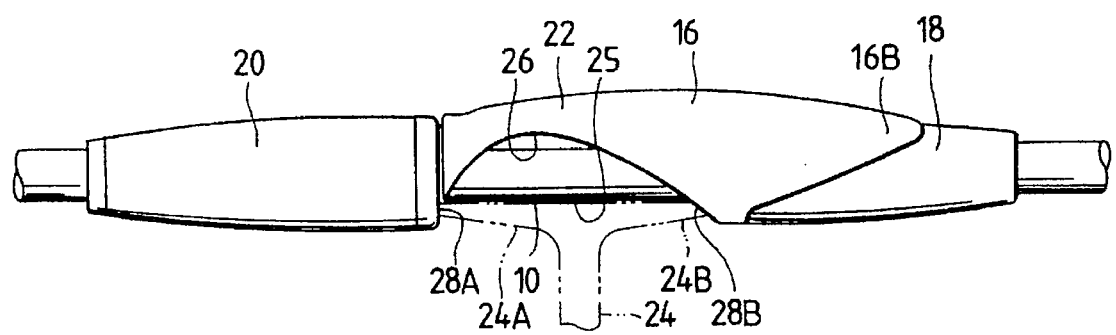
FIG. 3 is an enlarged side view of the fishing rod according to the present invention.
Figure 4:
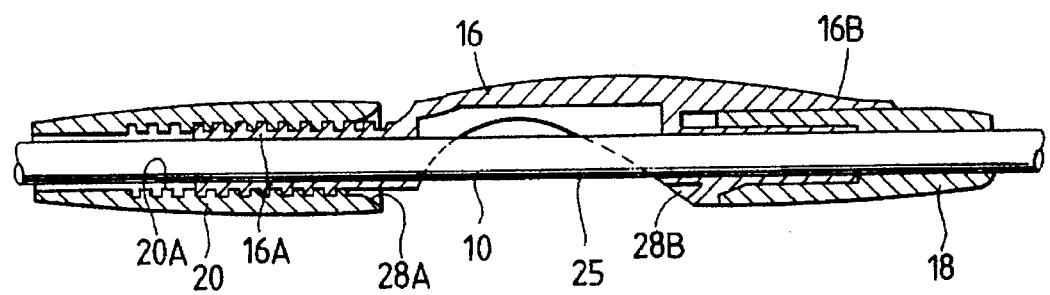
FIG. 4 is an enlarged longitudinal section of the fishing rod according to the present invention.

As shown in the Figures, the present invention includes a fishing rod 10, a butt grip 12, and reel fastening means 14. The fishing rod 10 includes a tip end 101 and a butt end 102, with a longitudinal axis 103 extending therebetween.

The reel fastening means 14 attaches a fishing reel (not shown) to a reel contact surface 25 of the fishing rod 10. The reel contact surface 25 is provided between the tip end 101 and the butt end 102, and may also be used to grasp and precisely manipulate the fishing rod.

The reel fastening means 14 includes a primary body 16 fitted on the fishing rod 10 and secured thereto, such as by an adhesive, a rear portion 18 between the primary body 16 and the butt end 102, and a secondary body 20 provided between the primary body 16 and the tip end 101. A part of the primary body 16 closest to the tip end 101 has a male screw 16A with which a female screw 20A of the secondary body 20 is engaged. The rear portion 18 may be secured to the fishing rod 10 by an adhesive. The part 16B of the primary body 16, which is closest to the butt end 102, partially covers the part of the rear portion 18 which is closest to the tip end 101 and opposite the reel contact surface 25.

The reel fastening means 14 has a first securing means 28B formed as a recess in the primary body 16 and open toward the tip end 101. A second securing means 28A is formed as a recess in the secondary body 20 and opens toward the butt end 102. When the reel is to be fastened to the fishing rod contact surface 25 by the fastening means 14, the secondary body 20 is moved away from the rear portion 18. First 24B and second 24A projections from a fishing reel mounting means 24 are received in the first and second securing means 28B and 28A, respectively, and the secondary body 20 is oppositely moved toward the rear portion 18. Tightening the secondary body 20 securely clamps the mounting means 24 against the fishing rod contact surface 25 by virtue of the cooperation between the securing means 28A,28B and the projections 24A,24B.

The primary body 16 has a bulge (FIGS. 1–5) which extends radially outward away from the longitudinal axis 103 to enhance stability while grasping the fastening means 14. The primary body 16 also has a constriction 22 between the bulge and the tip end 101. The transverse width with respect to the longitudinal axis 103 of the primary body 16 is minimal at the constriction 22. The transverse width of the constriction may be made generally equivalent to (solid lines), or less than (chain-dot lines in FIG. 1), the outside diameter of the fishing rod 10, thereby providing a comfortable rest for the middle and/or index finger(s). An expanded portion 23 is located toward the tip end 101 with respect to the constriction 22. The expanded portion circumscribes the rod 10 and has a relatively larger cross-sectional dimension than the constricted portion 22.

When the primary body 16 of the reel fastening means 14 is grasped in the angler's hand, the index and middle fingers are proximate to the front projection 24A, and the third and little fingers are proximate to the rear projection 24B. The middle finger is generally received in the constriction 22 between the bulge in the primary body 16 and the expanded portion 23. Consequently, the fishing rod can be precisely manipulated through the use of the finger received in the constriction 22, while the bulge ensures a stable grasp may also be comfortably maintained.

In the general axial proximity of the constriction 22, the primary body 16 is radially spaced away from the fishing rod 10 so that the fishing rod 10 is exposed in an opening 26. This enables the angler's hand to touch the fishing rod 10 thereby enhancing sensitivity to a fish biting the bait, as well as reducing the weight of the fastening means 14.

To ensure the entire palm of the angler's hand is used to comfortably grasp the fishing rod 10, the rear part 16B of the contours of the primary body 16 may extend over and radially cover some of the rear portion 18. Since the contours of the primary body 16, rather than the rear portion 18, are comfortably grasped by the entire palm, the angler gets a consistent feeling when grasping the fishing rod.

Figure 5:
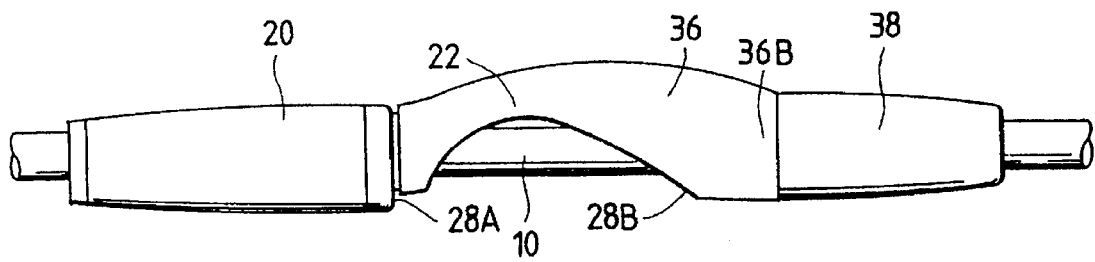
FIG. 5 is an enlarged side view of a variation on the fishing rod according to the present invention.

FIG. 5 shows the variation in which the corresponding rear part 36B of the primary body 36 does not extend over and radially cover some of the rear portion 38. Instead the primary body 36 and rear portion 38 abut one another at a plane perpendicular with respect to the longitudinal axis 103.

Although the fastening means 14 has been described with reference to the attached Figures, the present device is not limited thereby. For example, the fastening means 14 need not have a generally tubular shape, the fishing rod contact surface 25 may be flatly shaped, the fastening means 14 may have additional bumps on the opposite side with respect to the longitudinal axis 103, and/or the constriction 22 may have a different cross-section or size.

What is claimed is:

1. Fastening means for affixing a fishing reel to an elongated fishing rod, said fishing reel having mounting means for engagement with said fastening means and said fishing rod having a longitudinal axis extending from a tip end to a butt end, said fastening means comprising:

a primary body including first securing means for cooperating with said mounting means, said primary body further including a bulge extending radially outward away from said longitudinal axis, an expanded portion circumscribing said fishing rod, and a constriction of relatively reduced cross-section with respect to both said bulge and said expanded portion, said constriction is located between said bulge and said expanded portion as viewed in a plane view, said expanded portion is located between said constriction and said tip end, and said bulge is located between said constriction and said butt end, wherein said bulge is located radially opposite said first securing means with respect to said longitudinal axis; and a secondary body including second securing means for cooperating with said mounting means, said primary body and said second securing means are relatively rotatable to engage and disengage said mounting means from said first and second securing means.

2. The fastening means according to claim 1, wherein said mounting means comprises a first projection extending toward said butt end and a second projection extending toward said tip end, said first securing means comprises a first recess open toward said tip end which receives said first projection and said second securing means comprises a second recess open toward said butt end which receives said second projection.

3. The fastening means according to claim 1, further comprising:

screw means for enabling said relative rotation between said primary body and said second securing means.

4. The fastening means according to claim 1, further comprising:

a rear portion fixed to said fishing rod, said rear portion is located between said primary body and said butt end.

5. The fastening means according to claim 4, wherein said rear portion is partially radially interposed between said fishing rod and said primary body.

6. The fastening means according to claim 1, wherein said fishing rod is circumscribed by said primary and secondary bodies, and said fishing rod is exposed between said first and second securing means.

7. The fastening means according to claim 1, wherein said constriction and a projection of said mounting means extending toward said tip end are substantially similarly located along said longitudinal axis, and said bulge and said first securing means are substantially similarly located along said longitudinal axis.

8. Fastening means for affixing a fishing reel to an elongated fishing rod, said fishing reel having mounting means for engagement with said fastening means and said fishing rod having a longitudinal axis extending from a tip end to a butt end, said fastening means comprising:

a primary body including first securing means for cooperating with said mounting means, said primary body further including a bulge extending radially outward away from said longitudinal axis, an expanded portion circumscribing said fishing rod, and a constriction of relatively reduced cross-section with respect to both said bulge and said expanded portion as viewed in a plane view, said constriction is located between said bulge and said expanded portion, said expanded portion is located between said constriction and said tip end, and said bulge is located between said constriction and said butt end;

wherein said constriction is separated from said fishing rod with a gap radially interposed therebetween, and a portion of said bulge circumscribes said fishing rod; and a secondary body including second securing means for cooperating with said mounting means, said primary and secondary bodies are relatively movable to engage and disengage said mounting means from said first and second securing means.

9. Fastening means for affixing a fishing reel to an elongated fishing rod, said fishing reel having mounting means for engagement with said fastening means and said fishing rod having a longitudinal axis extending from a tip end to a butt end, said fastening means comprising:

a primary body including first securing means for cooperating with said mounting means, said primary body further including a bulge and a constriction, said bulge extends radially outward away from said longitudinal axis, said constriction is located between said bulge and said tip end and said bulge is located between said constriction and said butt end; and a secondary body including second securing means for cooperating with said mounting means, said primary and secondary bodies are relatively movable to engage and disengage said mounting means from said first and second securing means;

wherein said constriction and said fishing rod have substantially the same transverse width in a plane view with respect to said longitudinal axis.

10. Fastening means for affixing a fishing reel to an elongated fishing rod, said fishing reel having mounting means for engagement with said fastening means and said fishing rod having a longitudinal axis extending from a tip end to a butt end, said fastening means comprising:

a primary body including first securing means for cooperating with said mounting means, said primary body further including a bulge and a constriction, said bulge extends radially outward away from said longitudinal axis, said constriction is located between said bulge and said tip end and said bulge is located between said constriction and said butt end; and a secondary body including second securing means for cooperating with said mounting means, said primary and secondary bodies are relatively movable to engage and disengage said mounting means from said first and second securing means;

wherein said constriction has a transverse width in a plane view with respect to said longitudinal axis which is less than that of said fishing rod.

11. Fastening means for affixing a fishing reel to an elongated fishing rod, said fishing reel having mounting means for engagement with said fastening means and said fishing rod having a longitudinal axis extending from a tip end to a butt end, said fastening means comprising:

a primary body including first securing means for cooperating with said mounting means, said primary body further including
   a bulge extending radially outward away from said longitudinal axis,
   an expanded portion circumscribing said fishing rod, and
   a constriction of relatively reduced cross-section with respect to both said bulge and said expanded portion, wherein said constriction is located between said bulge and said expanded portion as viewed in a plane view, and said bulge is located at a position radially opposite said first securing means with respect to said longitudinal axis, said expanded portion is located between said constriction and said tip end, and said bulge is located between said constriction and said butt end, further wherein a share of each of said bulge, said expanded portion and said constriction compose a receiving means for receiving an angler's thumb; and a secondary body including second securing means for cooperating with said mounting means, said primary and secondary bodies are relatively movable to engage and disengage said mounting means from said first and second securing means.

12. The fastening means according to claim 11, wherein said receiving means is radially opposite said mounting means with respect to said longitudinal axis.

13. The fastening means according to claim 11, wherein said primary body defines a concave surface extending from said first securing means to said second securing means, and a convex surface opposite said concave surface, both said concave surface and convex surface overlying at least a portion of said bulge, said expanded portion, and said constriction, whereby said convex surface forms at least a portion of said receiving means.

* * * * *